United States Patent Office.

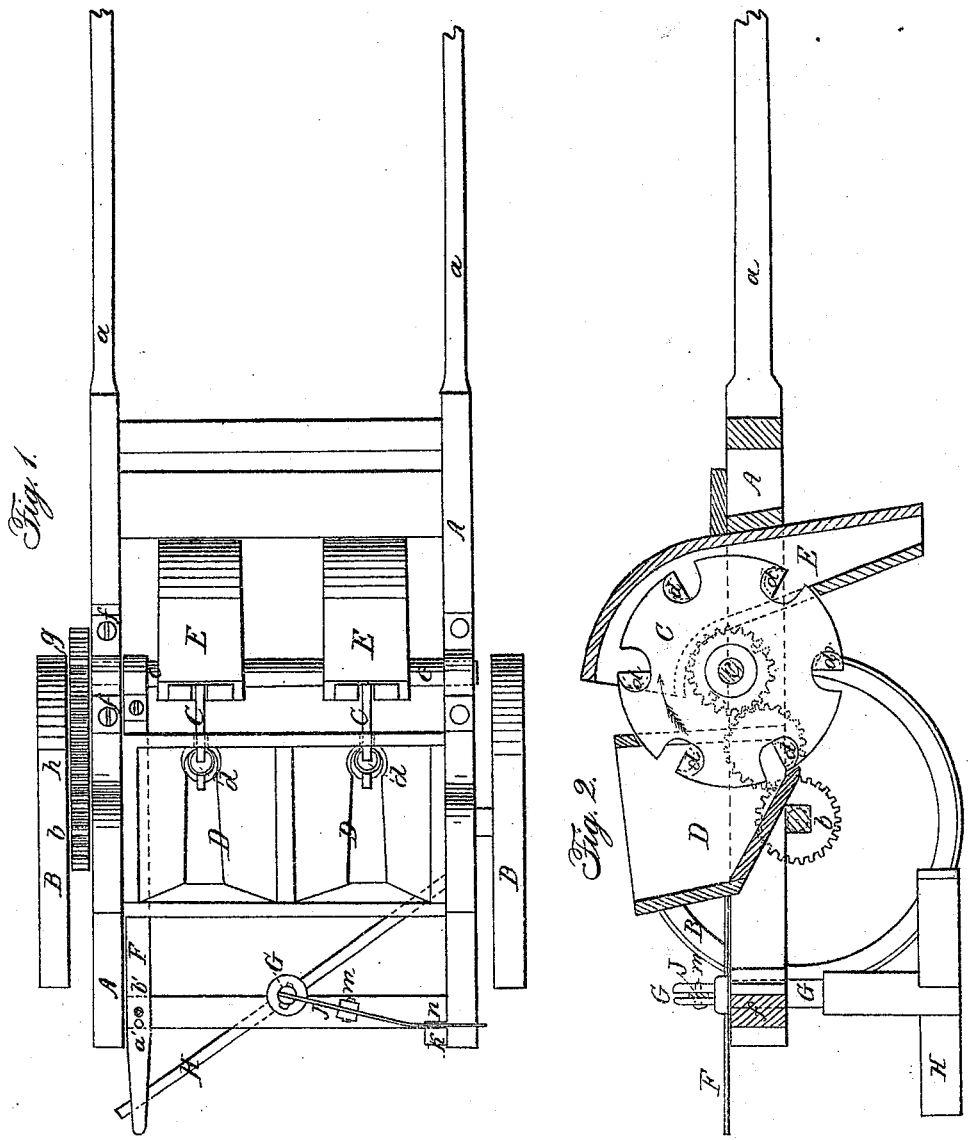

JOHN E. BENDIX, OF NEW YORK, AND MORRIS DIETSCH, OF WESTCHESTER, NEW YORK.

*Letters Patent No. 70,786, dated November 12, 1867.*

IMPROVEMENT IN POTATO-PLANTERS.

The Schedule referred to in these Letters Patent and making part of the same.

TO ALL WHOM IT MAY CONCERN:

Be it known that we, JOHN E. BENDIX, of the city, county, and State of New York, and MORRIS DIETSCH, of Westchester, in the county of Westchester, and State of New York, have invented certain new and useful Improvements in Potato-Planters; and we do hereby declare that the following is a full, clear, and exact description of the same, reference being had to the accompanying drawings, making a portion of this specification, in which—

Figure 1 is a plan view of a potato-planter constructed according to our invention.

Figure 2 is a vertical longitudinal section of the same.

Similar letters of reference indicate corresponding parts in both figures.

The object of this invention is to provide a potato-planter which will be simple and strong in construction, and in which the dropping of the seed in uniform quantities, at suitable distances apart, as well as the requisite covering of the said seed, will be secured in a superior degree.

The invention consists in one or more carrier-wheels, furnished at their peripheries with cups or buckets, and so combined with appropriate hoppers and tubular seeding-stocks that the seed may be conveyed in the desired quantities and at regular intervals to the seeding-stocks, whence it falls to the ground into furrows formed to receive it.

The invention further consists in a novel means whereby the covering-blade of the planter may be readily raised from or lowered to the ground, and securely retained in either position, as circumstances may require.

The invention furthermore consists in a novel arrangement of parts, whereby the movement of the carrier-wheel may be stopped, when desired, without interfering with the progressive motion of the machine.

To enable others to understand the construction and operation of our invention, we will proceed to describe it with reference to the drawings.

The horizontal main frame of the machine is shown at A, and is furnished with suitable shafts $a$, whereby the machine is drawn. The said frame is sustained upon a transverse axle, provided with suitable wheels B, one of which is furnished at its inner side with a spur-wheel, $b$, the purpose of which will hereinafter appear.

Secured upon a transverse shaft, $c$, situated toward the forward end of the frame A, are two wheels or disks, C, which are furnished at their peripheries with cups or buckets, $d$, which are placed at uniform distances apart, and are each of such size as to hold the quantity of seed potatoes required to be deposited in a single hill.

The rearmost portion of each of these carrier-wheels C passes through a suitably-shaped vertical slot, provided in the front and bottom of a hopper, D, situated immediately behind it upon the frame A. Each of the said hoppers has its sides and back made sloping in such manner that the seed or potatoes contained therein will gravitate toward that point in the bottom thereof at which the buckets of the adjacent carrier-wheel pass into the same, as just hereinbefore set forth.

E represents tubular seeding-stocks, of which there is one to each of the carrier-wheels, the upper end of each of the said stocks being curved back, as shown more clearly in fig. 2, to contain or enclose the forward portion of the said carrier-wheel, which enters the same through a suitable slot formed in the rearmost side thereof. One end of the shaft $c$ works through a bearing, $f$, which is capable of a longitudinal movement upon the frame A. The same end of the shaft just mentioned is furnished with a spur-wheel, $g$, which, in the operation of the machine, is rotated by similar gear $h$, pivoted to the frame A, and gearing into the spur-wheel $b$ of the adjacent supporting-wheel B.

A sliding bar, F, is attached at its forward end to the shaft $c$, close to the sliding bearing $f$, and extends back, with its rear portion resting upon the back end of the frame A, and furnished with two holes, $a'$ $b'$, so arranged with regard to a small vertical pin or stud, $i$, fixed in the said frame, that when the forward hole $b'$ has fitted into it the stud $i$, the spur-wheel $g$ will be held in gear with the gear-wheel $h$ to drive the carrier-wheels C, and when the pin is fitted into the rearmost of the aforesaid holes, the spur-wheel $g$ will be brought away from the gear-wheel $h$, just mentioned, so as to stop the motion of the carrier-wheels C without reference to the forward movement of the planter.

Working through a suitable guide or bearing at the central part of the rear end of the frame A, is a strong vertical bar, G, to the lower end of which is secured the horizontal covering-blade H, arranged, preferably, at an angle to the sides of the frame A, as shown more fully in fig. 1. The upper end of the bar G has pivoted to it one end of a lever, J, the fulcrum of which is shown at $m$, and the free end of which rests against an upwardly-extending post, K, and in such relation with a lateral extension or projection, $n$, upon the side of the said post, that when the free end of the aforesaid lever is placed above the said projection it will hold the covering-blade close upon the surface of the ground, as required in covering the seed, and when placed below such projection, will hold the aforesaid blade at a distance from the ground, as is desirable when it is simply required to move the planter from place to place, the aforesaid lever being retained, with its extremity either above or below the projection $n$, by its own spring or elasticity.

The hoppers being provided with a suitable quantity of seed potatoes, and the machine being properly drawn along, the carrier-wheels C are rotated in the direction indicated by the arrow in fig. 2, whereupon the cups or buckets $d$, as they pass through the hoppers D, are filled with the seed which are deposited in the furrows, being proportioned to the distance apart of the buckets $d$, and to the rapidity of the movement of the carrying-wheels with reference to the forward motion of the planter. When the seed has thus been deposited in the furrow, the covering-blade H, following after, scrapes the soil or earth over the said seed, and effectually covers the same, the operation of planting the potatoes being thus very rapidly performed, and in a very superior manner.

If desired, furrowing-shares of any suitable form may be secured in front of the seeding-stocks, in order that the furrows may be formed by the machine itself, and, when preferred, a seat for the operator or attendant may be placed upon any appropriate part of the frame A.

What we claim as our invention, and desire to secure by Letters Patent, is—

1. A carrier-wheel, C, provided at its circumference with cups or buckets $d$, in combination with a suitable hopper and tubular seeding-stock, substantially as and for the purpose specified.

2. The lever J and vertical holding-post K, arranged and operating in relation with each other, and with the sliding bar G of the covering-blade, substantially as and for the purpose specified.

3. The sliding bearing $f$, arranged in relation with the shaft which carries the cupped or bucketed carrier-wheel or wheels C, and the gearing connecting the said shaft with the driving-axle, whereby the movement of the carrier-wheel or wheels with reference to the hopper and seeding-stocks may be stopped without interfering with the progressive motion of the machine, substantially as herein set forth.

JOHN E. BENDIX,
MORRIS DIETSCH.

Witnesses:
   A. LE CLERC,
   CHARLES H. ASHTON.